A. F. JENKINS.
CONDENSATION TRAP FOR ACETYLENE LIGHTING APPARATUS.
APPLICATION FILED DEC. 12, 1911.

1,194,632.

Patented Aug. 15, 1916.
2 SHEETS—SHEET 1.

WITNESSES
Philip E. Barnes
A. A. Ege

INVENTOR
Alexander F. Jenkins
Chattin Bradway.
Attorney.

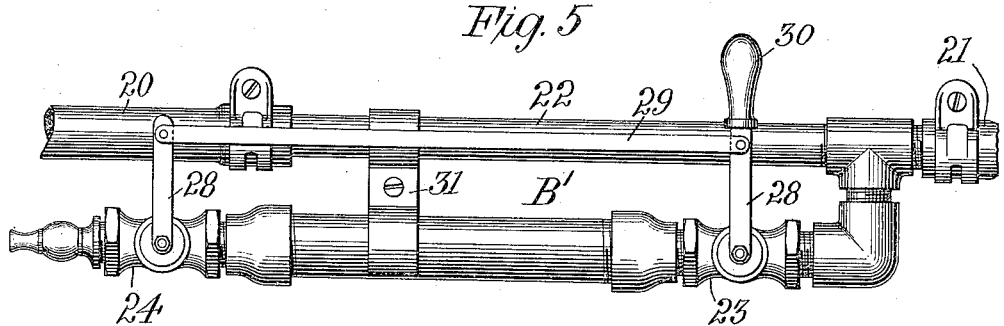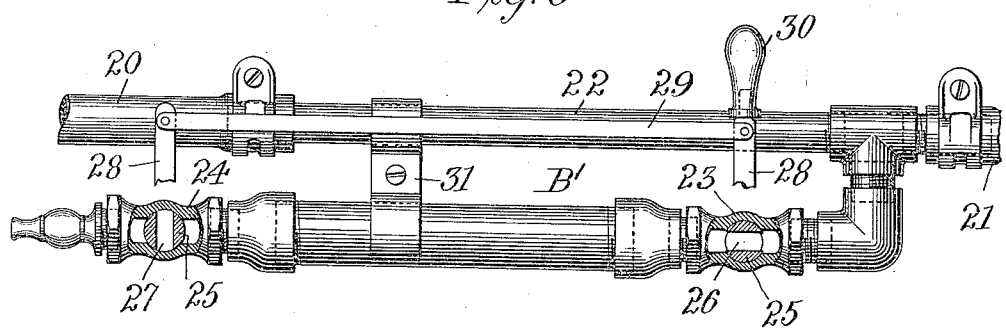

UNITED STATES PATENT OFFICE.

ALEXANDER F. JENKINS, OF BALTIMORE, MARYLAND, ASSIGNOR TO THE ALEXANDER MILBURN COMPANY, OF BALTIMORE, MARYLAND, A CORPORATION OF MARYLAND.

CONDENSATION-TRAP FOR ACETYLENE-LIGHTING APPARATUS.

1,194,632.   Specification of Letters Patent.   Patented Aug. 15, 1916.

Application filed December 12, 1911. Serial No. 665,284.

*To all whom it may concern:*

Be it known that I, ALEXANDER F. JENKINS, a subject of the King of Great Britain, residing at Baltimore city and State of Maryland, have invented certain new and useful Improvements in Condensation-Traps for Acetylene-Lighting Apparatus, of which the following is a specification.

In acetylene lighting systems of that type including portable lights connected with the source of gas supply by flexible conduits, it is important that the conduits be kept free from condensation, as otherwise the supply of gas to the light becomes unsteady and the flame is liable to be extinguished, and to avoid this, it is desirable to have a proper inclination from the light to the generator so that the condensation can drain back to the latter, but this is not feasible in all conditions of service, and to render lighting systems of this character reliable and efficient, it is desirable to equip the flexible hose or conduit with a condensation trap.

The object of the present invention is to provide a simple, effective and inexpensive condensation trap which can be applied to the flexible hose at any desired point between the generator and light, and which is so arranged that it will stand rough usage without being injured.

A further object of the invention is the provision of a novel form of trap which is attached to and supported on a hose in a simple and effective manner.

With these and other objects in view, as will appear as the description proceeds, the invention comprises the various novel features of construction and arrangement of parts which will be more fully described hereinafter and set forth with particularity in the claim appended hereto.

Figure 1:
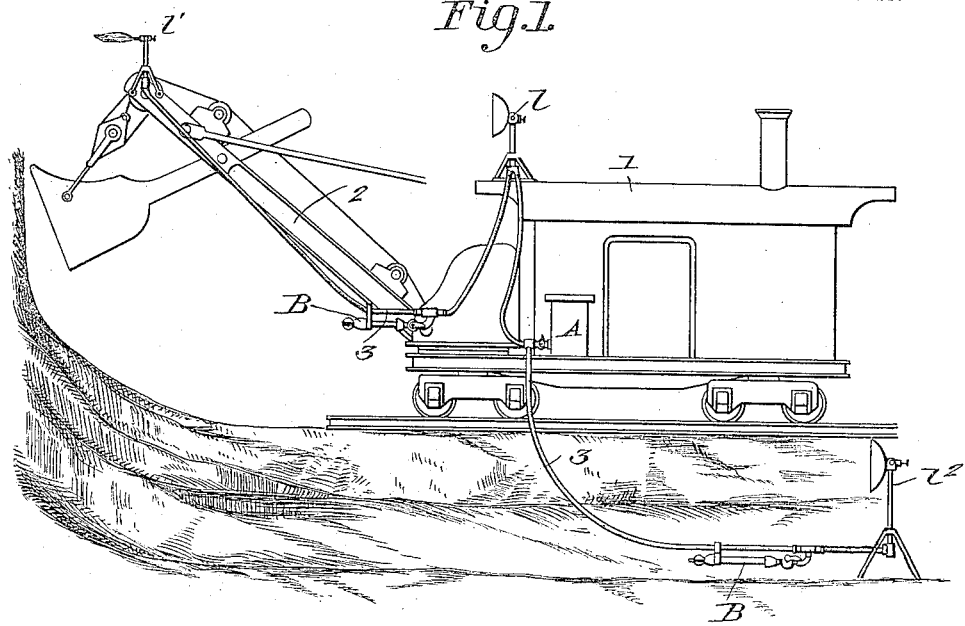
Figure 2:
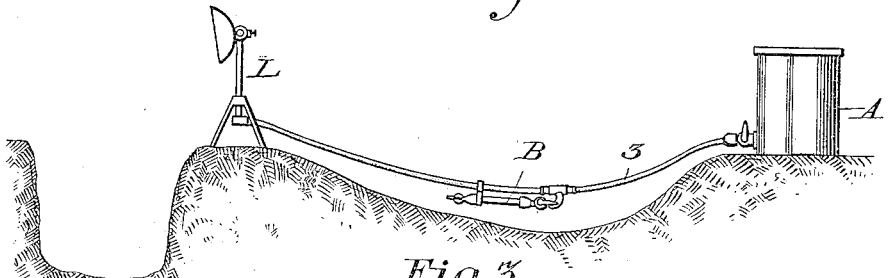
Figure 3:
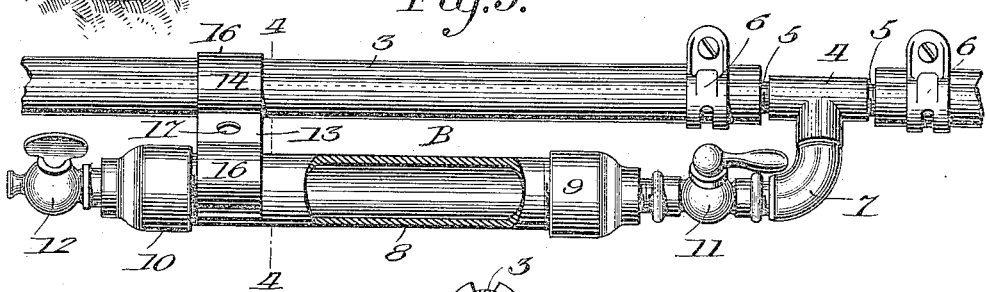

In the accompanying drawings, which illustrate one embodiment of the invention, Figure 1 is a side view of a steam shovel equipped with an acetylene lighting system to which the improved condensation trap is applied. Fig. 2 is a side view showing the lighting system adapted for another use, and showing a condensation trap applied to it. Fig. 3 is an enlarged side view of the condensation trap with a portion thereof broken away. Fig. 4 is a transverse section on line 4—4, Fig. 3. Fig. 5 is a side view of a modified form of the trap having interconnected gas cut-off and condensation drain valves. Fig. 6 is a similar view with the valves in section to show that one valve is closed while the other is open.

Similar reference characters are employed to designate corresponding parts throughout the views.

Referring to the drawing, A designates a suitable generator of gas such as acetylene that supplies gas to lights $l$, $l'$, $l^2$, so located that the work of excavating can be effectively carried on by night, the light $l$ being located on the roof 1 of the body of the steam shovel, the light $l'$ being arranged on the crane 2 of the shovel, and the light $l^2$ being supported on a portable tripod so that the rays of light can be directed at any point desired. The gas is supplied to these lights by flexible conduits or hose 3, and in order to prevent condensation from settling at any point where the hose sag and thus interrupt the supply of gas to the lights, the improved traps B that form the subject of this application are provided.

In Fig. 2, the lighting system is shown applied to a different use, and in the conduit 3, leading from the generator A to the light L, is applied the condensation trap B. It will be noted that the trap B is at the lowest point in the sag of the hose 3 so that all condensation will drain into the trap from both ends of the conduit, thus leaving the conduit perfectly free for the passage of gas to the burner. Where the trap is to be applied, the hose is cut in two and the parts joined together by a T-coupling 4 which has nipples 5 that extend into the adjacent ends of the two parts of the hose and the hose is fastened to the nipples by clips 6 of any approved construction. Attached to the coupling is an elbow coupling 7, the elbow being used so that the body of the trap can be disposed approximately parallel with the hose. The body of the trap consists of a section of pipe 8 of suitable length and diameter, and applied to the ends thereof are reducer couplings 9 and 10, the coupling 9 being connected by a cock or valve 11 with the elbow coupling 7, while at the other reducer coupling 10 is a relief or drain cock 12. In order to give rigidity to the trap and to enable it to withstand rough usage without being broken or injured, the end of the trap body opposite to the point where it is connected with the hose is a connecting clip 13, so that the trap will be fastened at both ends to the hose. This clip, as shown in Fig. 4, comprises two sections of strip metal 14 and 15 having clamping extremities or jaws 16 that grip the hose 3 and body 8, as shown, the two sections or parts of the clip being detachably fastened together by a bolt 17. When in use, the trap will be disposed in pendant position under the hose so that any liquid condensing in the latter will flow through the couplings 4 and 7, valve 11, which is normally opened, and accumulate in the body 8 of the trap. Whenever it is desired to empty the condenser, the normally opened valve 11 is closed and the normally closed valve 12 is opened, the first valve preventing gas from escaping through the trap and the second valve permitting the condensation to discharge. The weight of the trap exerted on the flexible hose will cause the latter to sag mostly where the trap is located, thus insuring the flow of the products of condensation in both directions toward the trap.

In the other form of the trap shown in Figs. 5 and 6, the gas-conducting conduit includes the hose sections 20 and 21 and a pipe section 22 which is approximately the same length as the trap B'. The trap itself is substantially the same as the form shown in Fig. 3, and the gas cut-off and condensation drain valves 23 and 24, respectively, are suitably interconnected so that one valve will always be closed while the other is open, and consequently when the condensation is to be drained from the trap by the opening of the drain valve, the gas cut-off valve will be closed, thus preventing the escape of gas from the gas-conducting conduit and without interrupting the flow of gas to the burner or burners of the lighting system. As shown in Fig. 6, the ported plugs 25 of the valves 23 and 24 are so disposed relatively to each other that the port 26 in the valve 23 is open when the port 27 in the valve 24 is closed, and vice versa. The plugs 25 have rigidly secured thereto arms or levers 28 that are connected together by a link rod 29 so that both levers will move simultaneously to cause the opening of one valve during the closing of the other. One lever is provided with a handle 30 for convenient manipulation. The levers 28 extend from the valves toward the gas-conducting conduit and the link 29 is disposed at one side of the pipe section 22, this arrangement being preferable since the device takes up less space and is less liable to injury. The clip or connecting device 31 is attached to the pipe section 22 instead of to the hose section of the conduit, as shown in Fig. 3. The pipe section 22 thus coöperates with the trap and connecting device 24 to form a rigid structure better capable of standing rough usage.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claim appended hereto.

Having thus described the invention, what I claim as new, is:—

The combination of two sections of flexible hose through which a vapor-containing gas flows, and a single device between the ends of the sections and constituting the following elements: a connector for uniting the sections, a weight for causing the hose sections to incline toward a common point, and being in the form of a condensation trap for collecting condensation that drains to the device by the inclining of the hose sections.

In testimony whereof I affix my signature in presence of two witnesses.

ALEXANDER F. JENKINS.

Witnesses:
 WM. J. McCAULEY,
 G. C. MILLERT.

Copies of this patent may be obtained for five cents each, by addressing the "Commissioner of Patents, Washington, D. C."